US011432306B2

(12) United States Patent
Trim et al.

(10) Patent No.: US 11,432,306 B2
(45) Date of Patent: Aug. 30, 2022

(54) OVERTAKING ANTICIPATION AND PROACTIVE DTCH ADJUSTMENT

(71) Applicant: International Business Machines Corporation, Armonk, NY (US)

(72) Inventors: Craig M. Trim, Ventura, CA (US); Kimberly Greene Starks, Nashville, TN (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 16/985,349

(22) Filed: Aug. 5, 2020

(65) Prior Publication Data

US 2022/0046657 A1    Feb. 10, 2022

(51) Int. Cl.
*H04W 4/00* (2018.01)
*H04W 72/12* (2009.01)
*H04W 84/18* (2009.01)
*H04W 52/28* (2009.01)
*H04W 4/70* (2018.01)
*H04W 4/46* (2018.01)
*H04W 4/38* (2018.01)

(52) U.S. Cl.
CPC ......... *H04W 72/1242* (2013.01); *H04W 4/38* (2018.02); *H04W 4/46* (2018.02); *H04W 4/70* (2018.02); *H04W 52/281* (2013.01); *H04W 84/18* (2013.01)

(58) Field of Classification Search
USPC .................................. 370/328, 329, 330, 331
See application file for complete search history.

(56) References Cited

U.S. PATENT DOCUMENTS

| 7,194,347 | B2 | 3/2007 | Harumoto |
| 10,440,689 | B2 | 10/2019 | Van Phan |
| 10,484,850 | B2 | 11/2019 | Kwoczek |
| 10,548,005 | B2 | 1/2020 | Kim |
| 11,277,848 | B2* | 3/2022 | Chae ................... H04W 72/082 |
| 2006/0277474 | A1* | 12/2006 | Robarts ................. H04L 51/212 |
| | | | 715/745 |

(Continued)

FOREIGN PATENT DOCUMENTS

| AU | 2015236490 A1 * | 11/2015 | .......... G06F 16/957 |
| CN | 106874597 B | 12/2019 | |

(Continued)

OTHER PUBLICATIONS

Haring et al., "A Cognitive Model of Drivers Attention", Printed Jul. 17, 2020, 6 pages.

(Continued)

*Primary Examiner* — David Q Nguyen
(74) *Attorney, Agent, or Firm* — Brian M. Restauro

(57) ABSTRACT

Embodiments of the present invention provide methods, computer program products, and systems. Embodiments of the present invention can be used to, in response to response to anticipating a maneuver to be performed by a vehicle, adjust one or more 5G dedicated traffic channels (DTCH) over a radio bearer network. Embodiments of the present invention can be used to revert the one or more adjusted 5G DTCH after the maneuver is performed by the vehicle.

18 Claims, 7 Drawing Sheets

(56) References Cited

U.S. PATENT DOCUMENTS

| | | | |
|---|---|---|---|
| 2018/0049225 A1 | 2/2018 | Lee | |
| 2018/0077617 A1* | 3/2018 | Xue | H04L 1/0014 |
| 2018/0166779 A1* | 6/2018 | Feria | H01Q 3/24 |
| 2018/0253976 A1 | 9/2018 | Inam | |
| 2018/0375568 A1* | 12/2018 | De Rosa | G08G 5/0039 |
| 2019/0207959 A1* | 7/2019 | Winkle | G08G 5/045 |
| 2019/0342894 A1 | 11/2019 | Yi | |
| 2020/0365042 A1* | 11/2020 | Mahalingam | G08G 5/0013 |

FOREIGN PATENT DOCUMENTS

| | | |
|---|---|---|
| DE | 112015000207 T5 | 7/2016 |
| WO | 2018087321 A1 | 5/2018 |
| WO | 2019134110 A1 | 7/2019 |
| WO | 2020035983 A1 | 2/2020 |

OTHER PUBLICATIONS

"Honda Cars seek IBM support to amplify their market share", IBM Connections, Updated Nov. 6, 2019 by Neha Bahl, 2 pages.

"How 5G can spark an electronics revolution", The technology enabling next-gen manufacturing and self-driving cars, IBM Institute for Business Value, © Copyright IBM Corporation 2018, 8 pages.

"Overtaking Assistant Could Help Prevent Many Traffic-related Deaths", Science News, Feb. 27, 2008, 4 pages, <https://www.sciencedaily.com/releases/2008/02/080226092749.htm>.

Basjaruddin et al., "Overtaking Assistant System Based on Fuzzy Logic", TELKOMNIKA, vol. 13, No. 1, Mar. 2015, doi: 10.12928/TELKOMNIKA.v13i1.499, 9 pages.

Franz et al., "Inter-Vehicle-Communications—Based on Ad Hoc Networking Principles: The FleetNet Project", 2005, ISBN: 3-937300-88-0, 271 pages.

* cited by examiner

OVERTAKING ANTICIPATION AND PROACTIVE DTCH ADJUSTMENT

BACKGROUND

The present invention relates in general to telecommunications networking and Internet of Things (IoT) devices and in particular to anticipate overtaking scenarios in the automated vehicle systems using additional primate data collection.

Advanced telecommunications networks, including 5G networks, offer certain features that are far more sophisticated and flexible than predecessor technologies. For example, 4G networks offer trilateration capabilities that allow a carrier to locate a user's position within about a hundred feet by comparing signals from multiple cell towers. 5G and later networks, however, can trilaterate a device's location with at least one order-of-magnitude greater precision, allowing a user's position to be identified within a range of tens of feet.

5G and similar networks can also handle far more simultaneous connections, making them more practical for Internet of Things applications, which can associate numerous IoT sensor devices with a single user. Such networks can also open high-bandwidth ad hoc channels that exhibit very low latency, allowing large groups of users to connect and disconnect at will in a dynamic mesh network. In addition, these networks can integrate artificially intelligent or cognitive applications directly into their network infrastructure, rather than requiring such functionality to be implemented as extrinsic services hosted by a cloud-computing service or other third-party resource.

5G networks enable the mass deployment of IoT devices by providing the ability to dynamically manage very large numbers of devices on ad hoc mesh networks. If, for example, a thousand people watching a parade are each carrying an average of five IoT devices, a legacy Internet Service Provider (ISP) would likely be unable to simultaneously manage and correlate the resulting large number of connections. The flexible service-orchestration capabilities of a 5G network, on the other hand, after detecting the presence of a mass assembly, allow the network to dynamically create an ad hoc mesh network that continuously adds and removes users as IoT devices log in and log out. Unlike legacy networks, which would require an extrinsic application, such as a hosted cloud service, to even approximate such features, 5G platforms support such high-speed ad hoc infrastructure through integrated, native orchestration services

SUMMARY

Embodiments of the present invention provide computer-implemented methods, computer program products and systems. In one embodiment of the present invention, a computer-implemented method is provided for in response to response to anticipating a maneuver to be performed by a vehicle, adjusting one or more 5G dedicated traffic channels (DTCH) over a radio bearer network; and reverting the one or more adjusted 5G DTCH after the maneuver is performed by the vehicle.

DETAILED DESCRIPTION

Figure 1:
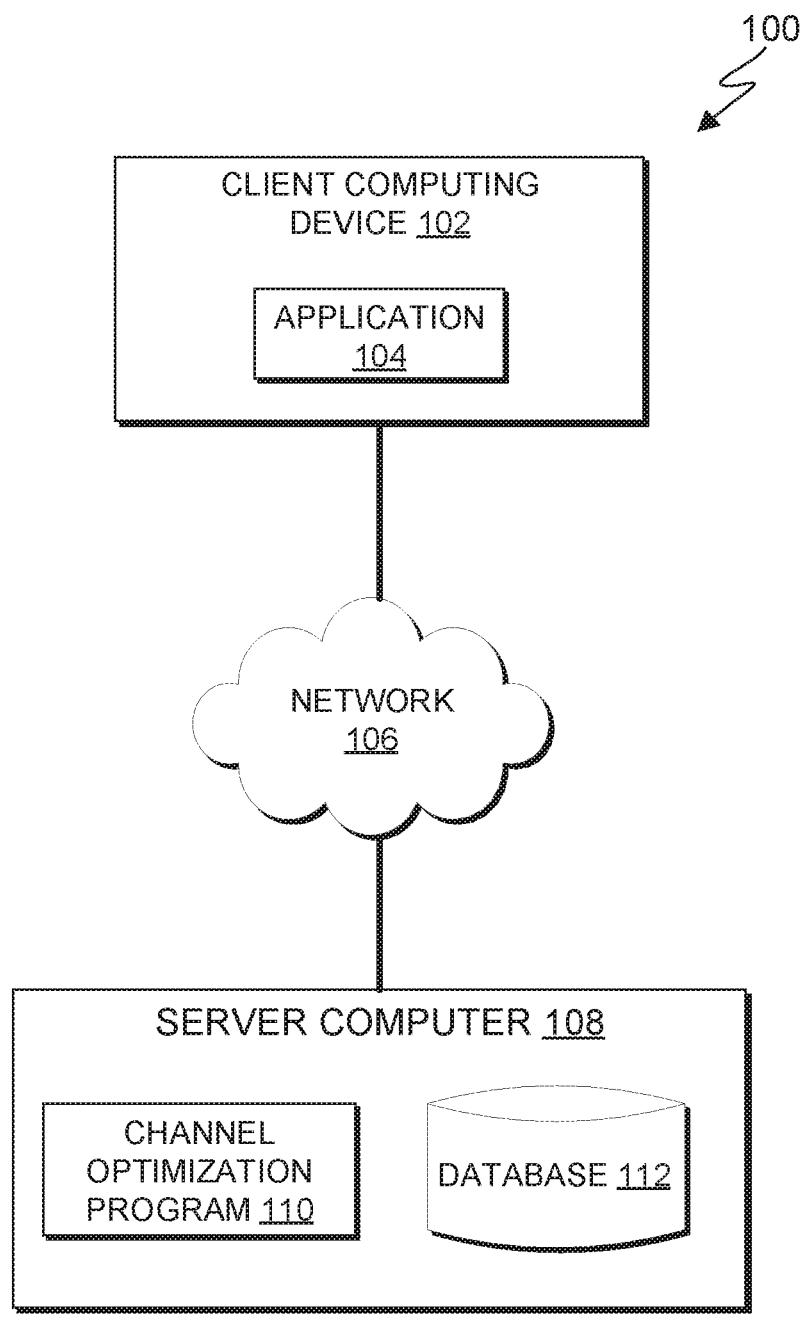
FIG. 1 is a functional block diagram illustrating a computing environment, in accordance with an embodiment of the present invention.

Embodiments of the present invention recognize that vehicle motor systems are growing day-by-day and becoming more intelligent with the integration of latest technology. The automation in case of self-driving vehicles is increasing and adapting newer technologies of Big Data and cloud to perform better. In the modern cars or motorbikes, various sensors are installed which keeps on sensing the desired information and provides it to the vehicle control system. A self-driving car can sense its environment and navigate without human inputs. To accomplish this task, each vehicle is usually outfitted with a GPS unit, an inertial navigation system, and a range of sensors including laser rangefinders, radar, and video. The vehicle also uses positional information from the GPS and inertial navigation system to localize itself and sensor data to refine its position estimate as well as to build a three-dimensional image of its environment.

With the enablement of 5G technology, one aspect of 5G that will impact the most consumers, EMBB (Enhanced Mobile Broadband) provides faster wireless connections and extends cellular coverage, including previously underserved areas. EMBB also supports more devices and more data in dense locales and enables high-bandwidth applications such as augmented and virtual reality. Use cases for EMBB focus on content and speed. EMBB enhance dynamic network configuration and management, placing reception and speed where it is needed. Increased bandwidth, massive IoT data and lower latency are all incremental improvements over previous generation wireless networking. Embodiments of the present invention recognize that 5G capabilities can be muted without network slicing and logical channeling. This unique form of virtualization allows for multiple logical networks to share a common physical infrastructure. Further, this allows application level segregation of the bandwidth and network resources.

Embodiments of the present invention can leverage Ultra-Reliable Low Latency Connectivity (URLLC) along with 5G networks. URLLC provides a mechanism for maintaining time-sensitive and secure messaging delivery. Embodiments of the present invention can improve usability for autonomous vehicles and remote equipment operations, such as hydropower plants or deep-water oil rigs. For example, factories might use cloud computing and network slicing with low-power cellular base stations called femtocells to establish private plant-centered networks, especially in IP-intensive situations or military applications. URLLC helps autonomous vehicles to communicate with each other to make smart decisions when approaching intersections or potential hazards.

Embodiments of the present invention combine URLLC within 5G networks. Specifically, embodiments of the present invention provides a novel mechanism to anticipate overtaking scenarios in the automated vehicle systems using additional primate data collection and allocates additional bandwidth to the vehicle's information collector dedicated traffic channel (DTCH) via instructing a virtual network function (VNF) and Programmability Framework of 5G telecom network (PNF). Embodiments of the present invention can instruct the VNF and PNF to perform Bandwidth, Quality of Service Identifier (QCI) and Guaranteed Bits per second (GBR) switching (for a respective channel in the 5G network) is performed via characterization of the DTCHs allocated to user and diverts the non-important data carrying DTCH BW to important overtaking data transportation 5G-DTCH. Thus, embodiments of the present invention avoid segmented congestion in Radio Interface and S1 bearer while overtaking and improved performance during critical overtaking situation. This also give price subscription benefit as BW is internally routed.

Embodiments of the present invention recognize that in the autonomous vehicle systems, there are mechanisms exists that can collect the information from the IoT devices and provide an assistant for the vehicle overtaking using cognition enabled capabilities. While the vehicle detects the possibilities of overtaking, (e.g., using camera sensing other objects in the trajectory path, slowing down the speed, no vehicle from another side, etc.), embodiments of the present invention can leverage machine learning models to arrive an overtaking decision (i.e., decide whether to initiate a maneuver to overtake another vehicle). Embodiments of the present invention recognize that this decision-making process can be resource intensive, (e.g., that data requirement to process the information received from sensors to make an over-taking decision).

In 5G telecom network, the automatous car has connection to the service orchestration layer wherein the information exchange is performed via multiple 5G-DTCH, each having dedicated bandwidth (BW), and QCI characteristics defined. when the vehicle needs to take the overtaking decisions, then all the DTCHs for autonomous vehicle will run with full pipe. This may take the congestion in the logical radio (though the physical radio has BW obtainable). Further, as the overtaking is extremely time critical operation, bandwidth congestion causes extreme penalties to the operations as well as this may result to unpleasant consequences, even accidents sometime.

Embodiments of the present invention recognize there is no mechanism today that can exploit for the over-taking decision and maneuvers that will be performed by the autonomous vehicles based on the extended conditions like type of the overtaking vehicles, along with the device characteristics, object power and other feature sets of the autonomous vehicle and accordingly updates the bandwidth allocation of the selected DTCH in 5G connected devices. Further, there is no method that can deal with adjustment of the DTCH bandwidth and QCI levels based on the importance of the events in the peer DTCH over same Physical Radio over user equipment (UE) and provides better priority-based delivery in case of situational emergency.

Accordingly, embodiments of the present invention provide solutions for exploiting the over-taking decision and maneuvers while adjusting the DTCH bandwidth and QCI levels based on an importance of events in peer DTCH over the same physical radio over UE. In this manner, embodiments of the present invention provide a better, priority-based delivery in an emergency. These solutions work in the service orchestration layer of 5G telecom network that provides a better DTCH Bandwidth control based on the vehicle overtaking anticipation. The stream information is collected at the service orchestration layer for the autonomous vehicle control unit and the Machine Learning models will detect the overtaking situations of the vehicle. When the overtaking of a vehicle is estimated, then embodiments of the present invention parse all the 5G-DTCH that are allocated to the UE entity for the user.

Embodiments of the present invention recognize that there could be multiple UE entities associated with the user and that will be collected based on an API interface to the service management platform that possesses the 5G-user information. These dedicated 5G-DTCH are then interviewed for their BW and QCI characteristics and they are characterized (i.e., classified) as priority and non-priority channels based on the nature of the traffic. In this embodiment, the information for autonomous vehicle will be treated as priority channel while other regular channels like entertainment and maintenance channels will be marked as non-priority channels. Other embodiments of the present invention can offer more granularity when rating channels for respective autonomous vehicles. For example, embodiments of the present invention can utilize a numeric scale and rate actions taken by a respective autonomous vehicle and, in response to meeting or exceeding a threshold requirement for importance, either allocate a network and classify the channel the vehicle is using (e.g., actions being performed by a vehicle) as important (e.g., transmissions and maneuvers for an emergency vehicle during an emergency event can be classified as important).

Once this has been identified, then embodiments of the present invention invoke a call to the Virtual Network Functions for the selected IMPROTANT channels to increase their bandwidth and change QCI to ensure granted data transmission. In scenarios where some of the vehicle DTCH is running on non-GBR mode, then embodiments of the present invention supply VNF instructions that will change logical 5G-DTCH to GBR mode that ensures guaranteed data transmission during the critical time of device overtaking.

In this embodiment, the service orchestration layer comprises a dedicated service for overtaking anticipation which will consider type of vehicles, road conditions, next vehicle type, next vehicle's driving pattering, etc. while taking the overtaking keenness. Accordingly, the software defined networking capabilities in the 5G-VNF is triggered to set the new bandwidth to accommodate all the sensor data with low latency over radio bearer.

Further, embodiments of the present invention can receive information about vehicles coming from opposite direction using the movement trajectory map, type of road, area of overtaking, potholes and speed breakers. Embodiments of the present invention can utilize a generated model to suggest the overtaking expectation of the vehicle. Embodiments of the present invention also consider the maximum allowed speed limits when invoking one or more machine learning algorithms to calculate an over-taking maneuver. For example, embodiments of the present invention can leverage an anticipation service to find the probability of the over-taking maneuver and instruct the Virtual Network Function and service management platform to change the DTCH-BW and QCI levels. Once the overtaking is completed, embodiments of the present invention can restore all the channels to their original state.

Embodiments of the present invention avoid data congestion that is created when sensors from an autonomous vehicle send important data to a service instance by updating data collection bandwidth of 5G-radio bearer channels when 5G-services detect and perform over-taking scenarios. This improves the performance of the overtaking decision system and pleasant user experience can be achieved by prioritizing the correct data streams at the time of vehicle overtaking. Embodiments of the present invention includes many peripheral components while anticipating the overtaking of vehicle which makes the invention more concrete with the enablement of 5G technology and helps human supporting at critical tasks.

Embodiments of the present invention improves autonomous driving system by enabling context awareness of important events of autonomous driving vehicle and ensures the proper bandwidth and communication interface allocation during the peak period. Embodiments of the present invention increase the data transmission performance during a sudden peak of Internet of Things (IoT) data collected at the time of overtaking of the vehicle. In turn, this increases reliability of autonomous vehicle systems with the enablement of high-speed data transmission.

Embodiments of the present invention provides additional benefits of building better bandwidth management to vehicles by dynamically and selectively adjusting DTCH and BW. Certain embodiments enable utilization of available BW to the user based on priorities. Embodiments of the present invention can further provide capabilities to shift the BW for casual purpose and switching of non-GBR to GBR contents for certain time being. This saves overall cost of subscription. Finally, embodiments of the present invention improve over-taking decision making by considering peripheral parameters.

Embodiments of the present invention presents users an opt-in/opt-out mechanism that enables a user to participate in the charging service. In some embodiments, users can be notified when data is collected and/or otherwise used (e.g., vehicle information such as current charge, autonomous driving decisions, maneuvers, route to destination, waypoints, average power consumption, etc.).

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 7.

In this embodiment, client computing device 102 is an electronic vehicle (e.g., a digital device) associated with a user and includes application 104. Application 104 communicates with server computer 108 to access channel optimization program 110 (e.g., using TCP/IP) to access user and vehicle information. Application 104 can further communicate with channel optimization program 110 to transmit instructions to dynamically profile channels based on characteristics and, in response to receiving a request for an overtaking maneuver, modify existing channels to accommodate the request and return the existing channels to their respective states to their baseline characteristics after the request has been fulfilled, as discussed in greater detail with regard to FIGS. 2-5.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts channel optimization program 110 and database 112. In this embodiment, channel optimization program 110 resides on server computer 108 and can be implemented in a 5G infrastructure that interacts with cloud computing servers. In other embodiments, channel optimization program 110 can have an instance of the program (not shown) stored locally on client computer device 102. In yet other embodiments, channel optimization program 110 can be stored on any number or computing devices.

In this embodiment, channel optimization program 110 adjusts 5G DTCH over radio bearer in anticipation of an overtaking maneuver being performed. Channel optimization program 110 can also update the non-important channels accordingly. Channel optimization program 110 can receive data from IoT devices connected to network 106. In this embodiment, channel optimization program 110 can receive data from IoT devices via usual means to a service orchestration layer of 5G telecom network (not shown) and use the information to anticipate when an overtaking calculation is going to occur and subsequently performed overtaking maneuver.

Channel optimization program 110 proactively detects vehicle overtaking decisions based on the various additional factors like vehicle power, road condition, etc. Channel optimization program 110 can additionally collect and prioritize device trajectory paths, proximate vehicle types, distance, capacity, power, etc. while anticipating the overtaking decision. Channel optimization program 110 can include an API interface from autonomous and manual driving system that can override the overtaking decision and DTCH bandwidth.

Channel optimization program 110 adjusts 5G DTCH over radio bearer in anticipation of an overtaking maneuver being performed by sending inspection to the Virtual Network Function to allocate additional 5G-DTCH bandwidth over radio interface and S1 bearer to the devices that are involved in the vehicle overtaking process. Channel optimization program 110 can then identify participant DTCH channels at the VNF and Physical Network Function layer. Channel optimization program 110 can then adjust the 5G-DTCH bandwidth of these channels.

Channel optimization program 110 adjusts 5G DTCH over radio bearer in anticipation of an overtaking maneuver by parsing user based DTCH allocation and categorization of the DTCH as priority and non-priority. In this embodiment, channel optimization program 110 classifies calculations and vehicle maneuvers as priority channels. Conversely, entertainment related functions are allocated and classified as non-priority channels. For example, radio functions, playing songs, would be identified as non-priority while route guidance, GPS guidance, vehicle maneuvers (e.g., autonomous driving capabilities, overtaking maneuvers, parking maneuvers, adaptive cruise control, etc.) would be identified as priority. In this embodiment, channel optimization program 110 lowers non-priority channel BW and QCI levels (e.g., throttles bandwidth) in scenarios where more bandwidth is needed (e.g., incremented) for overtaking stakeholder channels. Conversely, channel optimization program 110 increments BW and alters QCI levels for the channels that are needed for device overtaking.

In certain embodiments, channel optimization program 110 can change GBR to non-GBR and vice versa based on situational channel importance during overtaking.

In this embodiment, database 112 functions as a repository for stored content. In this embodiment, content includes user profiles, device profiles and persona profiles. In some embodiments, database 112 can include ticket history or requests to participate in application and device improvement. Database 112 can reside on a cloud infrastructure and stores user generated information. In some embodiments, database 112 can function as a repository for one or more files containing user information. In this embodiment, database 112 is stored on server computer 108 however, database 112 can be stored on a combination of other computing devices (not shown) and/or one or more components of computing environment 100 (e.g., client computing device 102) and/or other databases that has given permission access to Channel optimization program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
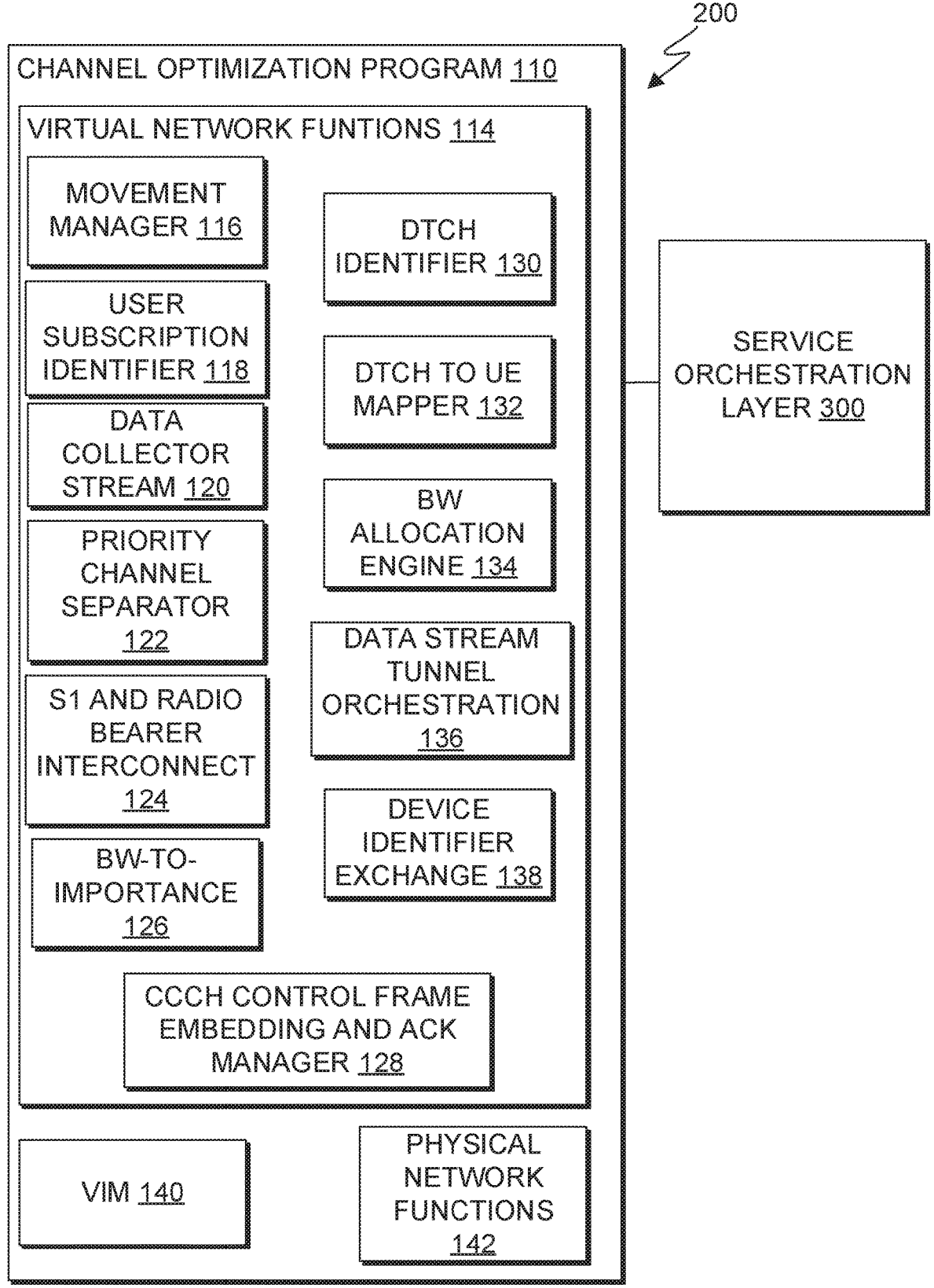
FIG. 2 is a functional block diagram illustrating components of a channel optimization program, in accordance with an embodiment of the present invention.

FIG. 2 is a functional block diagram illustrating components of a channel optimization program, in accordance with an embodiment of the present invention.

This block diagram depicts certain components of channel optimization program 110. In this embodiment channel optimization program can be incorporated into a 5G infrastructure management plane (e.g., 5G infrastructure management plane 200) and interact with another instance of channel optimization program 110 in the service orchestration layer (e.g., 300) as discussed in greater detail with regard to FIG. 3. In this embodiment, channel optimization program 110 can include virtual network functions 114. In other embodiments, channel optimization program 110 can utilize or otherwise interface with other virtual network function similarly hosted on a 5G infrastructure management plane.

In this embodiment, virtual network functions 114 includes movement manager 116, user subscription identifier 118, data collector stream 120, priority channel separator 122, s1 and radio bearer interconnect 124, BW-to Importance map 126, CCCH control frame embedding an ack manager 128, DTCH identifier 130, DTCH to US mapper 132, BW allocation engine 134, data stream tunnel orchestration 136, and device identifier exchange 138. In certain embodiments data stream tunnel to orchestration 136 interfaces with a data stream receiver tunnel end in a service orchestration layer of a 5G telecom network (not shown).

Virtual network functions 114 are the movement tracers in the 5G VNF plane. These services collects the device locations using GPS maps and monitors vehicle movement using existing data collectors. Virtual network functions 114 includes movement manager 116, user subscription identifier 118, data collector stream 120, priority channel separator 122, s1 and radio bearer interconnect 124, BW-to Importance map 126, CCCH control frame embedding an ack manager 128, DTCH identifier 130, DTCH to US mapper 132, BW allocation engine 134, data stream tunnel orchestration 136, and device identifier exchange 138.

Movement manager 116 enables movement tracers in the 5G VNF plane. Movement manager 116 enables collection of device locations (with user permission) using GPS maps and vehicle movement using other, existing data collectors.

User subscription identifier 118 can be one or more subscription management platforms. User subscription identifier 118 functions to perform user authentication and user driven offering of additional claimed functionality.

Data collector stream 120 is a stream data collector of APIs. These APIs initiate the data collection from end devices and collects the data stream. The common data as part of stream is GPS location. Other data collected can include dynamic vehicle characteristics like speed, direction, etc.

Priority channel separator 122 keeps the list of priority and non-priority DTCHs based on the nature of traffic served by the channel. S1 and radio bearer interconnect 124 are interconnect APIs to the S1 and RLC controller that offers end-to-end message delivery over 5G network. The RLC controller interconnect APIs are called using these bearer connectors to communicate over the network, BW-to-Importance map 126 is a data structure keeping the map of all the DTCH created to the device and the type of traffic it is serving. Based on the nature of traffic, BW-to-Importance map 126 adds the priority factor and maintains the map. This will be used while adding the channel bandwidth.

CCCH control frame embedding an ack manager 128 controls frame instruction by sending logic in 5G network wherein the control commands are embedded into CCCH frames and sent over the radio bearers. DTCH identifier 130 provides DTCH decoding for connection control flags and to determine the DTCH attached with respective UE devices.

The DTCH UUID extraction is part of this function which will be used for tracking the DTCH in further processing.

DTCH to UE mapper 132 is a mapping data structure keeps the list of UE devices and their DTCH created. This list will be used to get the bandwidth allocation gathering and modification. BW allocation engine 134 is responsible for maintaining user based bandwidth management and device to bandwidth allocation for the user. This engine is connected to VNF functions that negotiates the DTCH bandwidth and accordingly it will be updated over the DTCH.

Data stream tunnel orchestration 136 is a secure communication to service orchestration and programmability framework. Device identifier exchange 138 is a UUID exchange mechanism wherein device identity (IMSI or TMSI will be shared by service orchestration to the VNF which will be used for DTCH to UE mapping).

Channel optimization program 110 also includes VIM 140 and physical network functions 142. VIM 140 is a virtual infrastructure manager that is in an existing 5G layer that works below the Virtual network functions and provides the conversion facility between VNF and PNF functions. Physical network functions 142 is a hardware abstraction layer in 5G network that offers the connection establishment with UE devices and DTCH creation for actual data and instruction transmission over radio interface. In this embodiment, physical network functions 142 interacts with fixed access network which in turn communicates to an E-node B tower which communicates with an autonomous vehicle.

Figure 3:
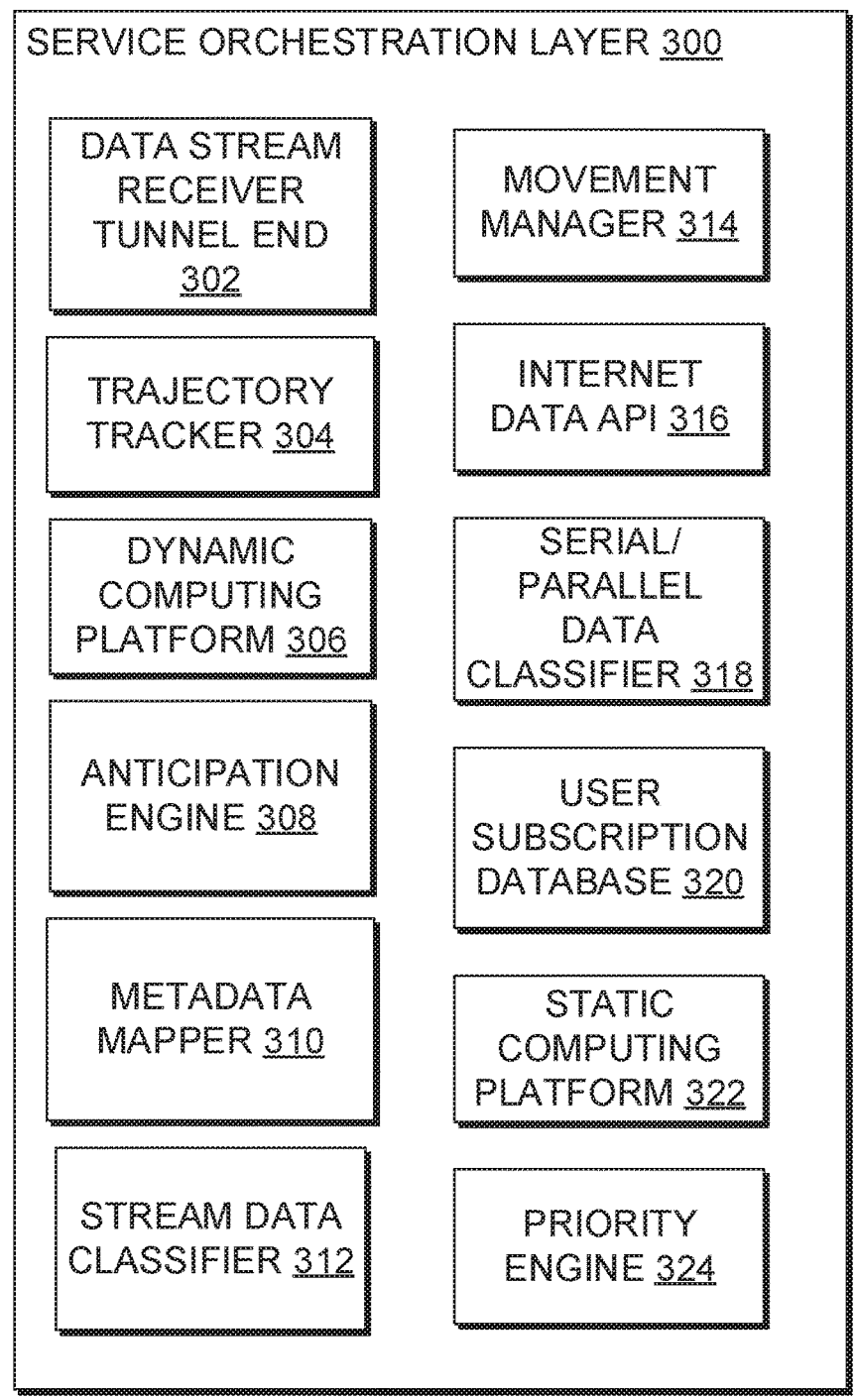
FIG. 3 is a functional block diagram of a service orchestration layer, in accordance with an embodiment of the present invention.

FIG. 3 is a functional block diagram of a service orchestration layer, in accordance with an embodiment of the present invention FIG. 3 depicts a service orchestration layer 300. Service orchestration layer 300 includes data stream receiver tunnel end 302, trajectory tracker 304, dynamic computing platform 306, anticipation engine 308, metadata mapper 310, stream data classifier 312, movement manager 314, internet data API 316, serial/parallel data classifier 318, user subscription database 320, static computing platform 322, and priority engine 324.

Data stream receiver tunnel end 302 are stream based data receivers that collect the information from VNF for further processing. This is a communication mechanism for stream-based data like speed, user trajectory data, and other vehicle information.

Trajectory tracker 304 keeps the track of vehicles and their trajectory motion to get the overtaking anticipation data. Dynamic computing platform 306 includes one or more dynamic data computing devices that collect various interrelated information like vehicle characteristics form internet situated data, weather profile, active usage monitoring of other channels created to the user plane, etc.

Anticipation engine 308 provides an ability to anticipate the vehicle overtaking considering the dynamic platforms. For example, example, if a vehicle (a car) proceeding at a higher rate of speed than another vehicle in the same lane (e.g., construction vehicle), then this engine anticipates the overtaking.

Metadata mapper 310 is a database for saving history objects and the related device metadata caching that will be used for next computation. Stream data classifier 312 are 5G based naïve classifiers for input data filtering. Movement manager 314 functions to interact with movement manager 116 and enables collection of device locations (with user permission) using GPS maps and vehicle movement using other, existing data collectors.

Internet data API 316 is an out of bound data collector APIs that gathers real time internet situated data. Serial/parallel data classifier 318 include standard 5G based classifiers in cognitive orchestration layer which is responsible for cognitive filtering of input data and to extract desired information. User subscription database 320 is a subscription manager to perform authentication services to subscribed users. Static computing platform 322 performs static data parsing mechanisms. Static computing platform 322 is responsible for configuration parsing, user-based preference gathering, and DTCH based allocation policies. Priority engine 324 is a service orchestration instance of DTCH priority map. This map keeps the importance weightage and the DTCH UUIDs allocated to the device.

In this embodiment, channel optimization program 110 can transmit instructions to and leverage components in service orchestration layer 300 to improve feedback.

Figure 4:
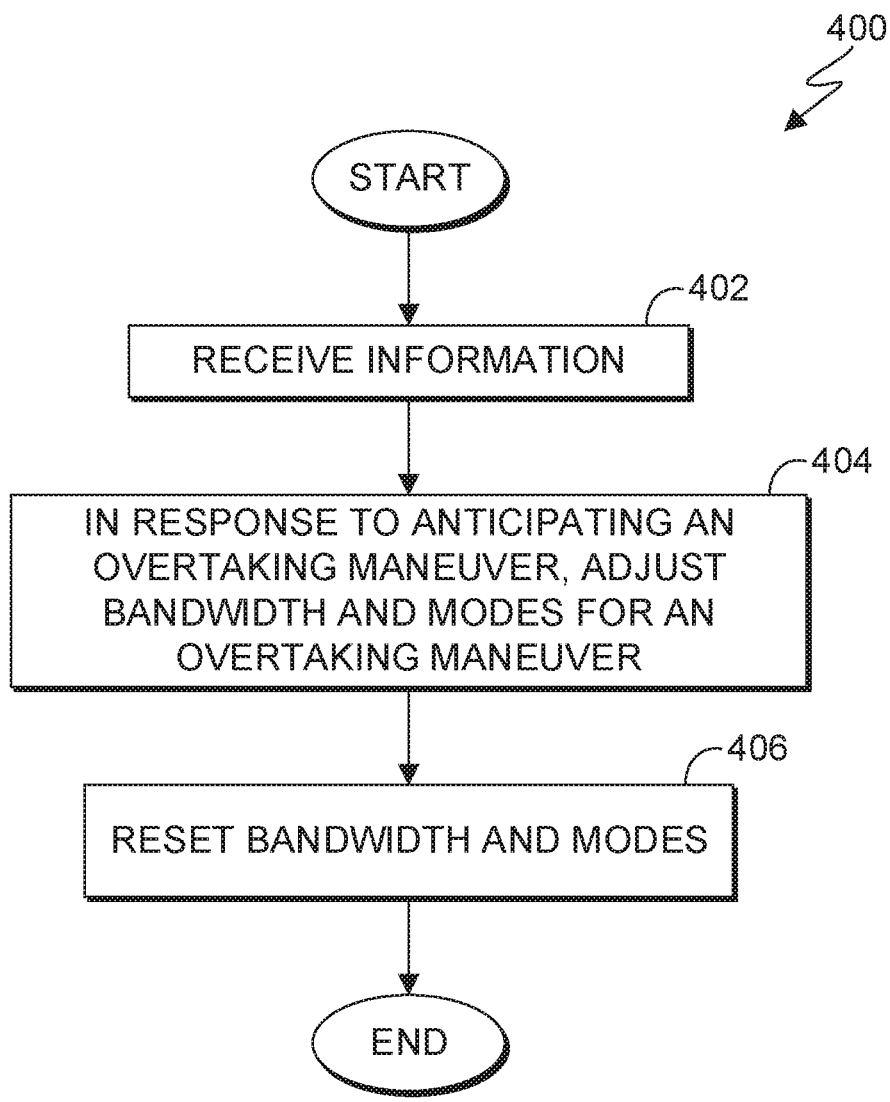
FIG. 4 is a flowchart depicting operational steps to dynamically adjust a channel during an over-taking scenario, in accordance with an embodiment of the present invention.

FIG. 4 is a flowchart depicting operational steps to dynamically adjust a channel during an over-taking scenario, in accordance with an embodiment of the present invention.

In step 402, channel optimization program 110 receives information. In this embodiment, channel optimization program 110 can transmit instructions to an instance of channel optimization program 110 in the service orchestration layer of a 5G telecom network and transmit instructions to an instance of channel optimization program 110 in the virtual network layer of the 5G telecom network. In this embodiment, the instance in the service orchestration layer collects information from one or more device sensors and internet situated resources and transmits the collected information to channel optimization program 110. Information collected can include vehicle type, capacity, max speed possible, current location, current speed, trajectory path, etc. In this embodiment, the instance in the virtual network function layer (e.g., dedicated traffic channels for mobile data such as autonomous vehicles) collect respective data and transmits the information to the instance in the service orchestration layer. Information collected by DTCH can include trajectory attributes, device locations, speed information, power, etc.).

Information collector at VNF gathers the stream data from device platforms to get the ground level information from devices while service orchestration instance gets the configuration priorities, parsing internet situated data gathering and other history mappers for overtaking anticipation.

Information collected by an instance of channel optimization program 110 (e.g., via data collector stream 120) can also include road conditions, such as potholes, construction, detour information, etc. Channel optimization program 110 can then map artifacts identified in the received information using DTCH to UE mapper 132. In certain embodiments, channel optimization program 110 can transmit the received information to service orchestration layer 300 (e.g., to metadata mapper 310 and serial/parallel data classifier 318) to ma identified artifacts to metadata-mapper classes and classify the artifacts using serial/parallel data classifier 318. Accordingly, channel optimization program 110 can map the attributes and classify classes of those attributes based on the vehicles identity.

Channel optimization program 110 can then access an in-bound approach of communication. In this embodiment, an inbound approach of communication can be accessed by or receive information from a Media Access Control (MAC) protocol made across a common data collector service. This allows channel optimization program 110 to access static platform data (e.g., vehicle data). MAC will be used here to gather the DTCH allocation to UE as well. The DTCH allocation need to be gathered using MAC decoding as DTCHs are sharing the physical device addresses. In this embodiment, static data can include platform identification, hardware specification, and model internal architecture. Static platform data can also include supported speed limits, vehicle limited top speeds, number of pistons, engine type, hardware default settings, etc. In this embodiment, channel optimization program 110 can parse the received static platform data using a regex-based document classifier and saves the information into respective metadata mappers. In this embodiment, parsing and classifying static information includes identifying the configuration priorities, parsing internet situated data gathering and other history mappers for overtaking anticipation (e.g., part of static platform). In this embodiment, channel optimization program 110 utilizes static information during DTCH assignment tuning.

In step 404, channel optimization program 110 adjusts bandwidth and modes for an overtaking maneuver in response to anticipating an overtaking maneuver. In this embodiment, channel optimization program 110 can anticipate an overtaking maneuver by receiving overtaking calculations (e.g., vehicle trajectories, request to perform an overtaking maneuver, length of time it would take to complete an overtaking maneuver, current, actual, and predicted locations of vehicles based on speed, charge, etc.) from a prediction program.

In other embodiments, channel optimization program 110 can receive a request can be for an overtaking maneuver. In scenarios where channel optimization program 110 receives a request for an overtaking maneuver (e.g., user input), channel optimization program 110 can access the received, real-time information collected from step 402 and generate overtaking possibilities.

In this embodiment, channel optimization program 110 adjusts bandwidth and modes for an overtaking a maneuver by identifying vehicles in proximity to the requesting vehicle, identifying the probability of success of the overtaking maneuver, parsing channels used by each respective vehicle connected to the network, and identifying them as either priority or non-priority. Channel optimization program 110 can then adjusts the bandwidth and QCI levels of priority and non-priority based on current and predicted bandwidth requirements. For example, channel optimization program 110 can allocate more bandwidth to priority channels.

In this embodiment, channel optimization program 110 parses channels used by each respective vehicle connected to the network and identifies bandwidth and QCI characteristics. Channel optimization program 110 characterizes each identified channel used by respective vehicles connected to the network (e.g., vehicles in proximity to the requesting vehicle and the requesting vehicle) and classifies them as priority and non-priority channels based on the nature of the traffic. In this embodiment, the information for autonomous vehicle will be treated as priority channel while other regular channels like entertainment and maintenance channels will be marked as non-priority channels.

In this embodiment, channel optimization program 110 can determine multiple ways to distinguish between the priority and non-priority channels. The channel used for entertainment are non-priority, channels tagged to the other user applications like social media are also treated as non-priority. Channel optimization program 110 can gather and identify these non-priority channels using user preference and update the system accordingly. The non-GBR channels are usually non-priority channels as they are used for non-important applications as per standards.

In this embodiment, channel optimization program 110 adjusts respective channels classified as priority or non-priority in a manner that optimizes the overtaking maneuver. In this example, channel optimization program 110 adjusts respective channels by transmitting instructions to the VNF to select 5G-DTCH lists (e.g., channels) based on a dynamic platform computing and eNodeB traffic data. Effectively, channel optimization program 110 performs a handshake between UE and the VNF to change the bandwidth, QCI, and GBR stats. GBR is Guaranteed bit per second and non-Guaranteed bit per second parameter for channel. This parameter is used for a GBR type bearer and indicates the bandwidth (bit rate) to be guaranteed by the 5G network. It is not applied to a non-GBR bearer with no guaranteed bandwidth.

Channel optimization program 110 can then transmit instructions to (e.g., invokes) the physical network functions in 5G-SDN to actuate new bandwidth levels and respective radio DTCH and over S1 bearer. Channel optimization program 110 can adjust bandwidth levels are by using Physical Network Function using MAC based channel tuning parameters. This will be performed by tuning the PNF-DTCH parameters for bandwidth and other interrelated channel settings. Channel optimization program 110 can transmit instructions to VNF to instructs the PNF to tune the parameters.

In this embodiment, channel optimization program 110 provides a mechanism using an in-bound and out-of-bound APIs in the service orchestration layer to override a generated overtaking decision. In this manner, channel optimization program 110 can be used to bypass recommendations by channel optimization program 110 and allow for manual operation of a vehicle.

In step 406, channel optimization program 110 resets bandwidth and modes. In this embodiment, channel optimization program 110 resets bandwidth and modes after the overtaking maneuver is performed by the requesting vehicle.

Figure 5:
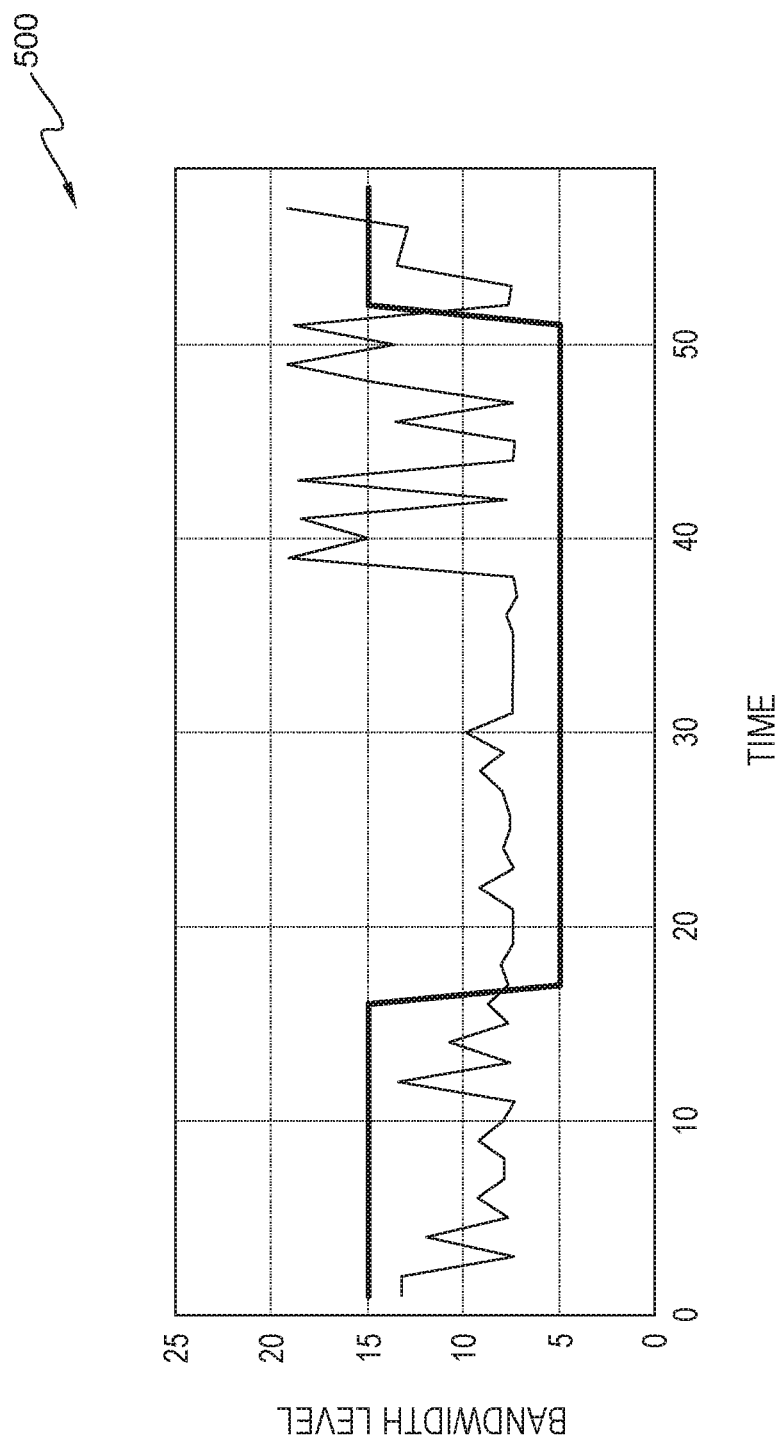
FIG. 5 is an example diagram that shows DTCH, BW, and QCI for a non-priority channel.

FIG. 5 is an example diagram that shows DTCH, BW, and QCI for a non-priority channel.

In this example diagram 500, channel optimization program 110 adjusts normal DTCH bandwidth and QCI limits are shown for an entertainment channel (e.g., satellite radio) during an overtaking maneuver. The X axis shows timelines while the Y axis indicates bandwidth allocation and consumption. This example also shows actual data usage or requirements for the entertainment channel. In this example, the limit shows at 15 (e.g., 15 MB/s was the original channel bandwidth). In this example, channel optimization program 110 has received a request and is predicting that an overtaking maneuver will be calculated and subsequently performed. In this example, channel optimization program 110 adjusts the normal DTCH BW and QCI maximum to 5 (e.g., 5 MB/s), effectively throttling data transmission in the entertainment channel. This could result in latency while data is being accessed (e.g., as shown by actual requirements for the channel exceeding the limit set by channel optimization program), however, this frees up bandwidth for the channel dedicated for autonomous vehicle maneuvering. After the maneuver has been performed, channel optimization program 110 reverts the DTCH bandwidth and QCI levels to "normal" settings of 15.

Figure 6:
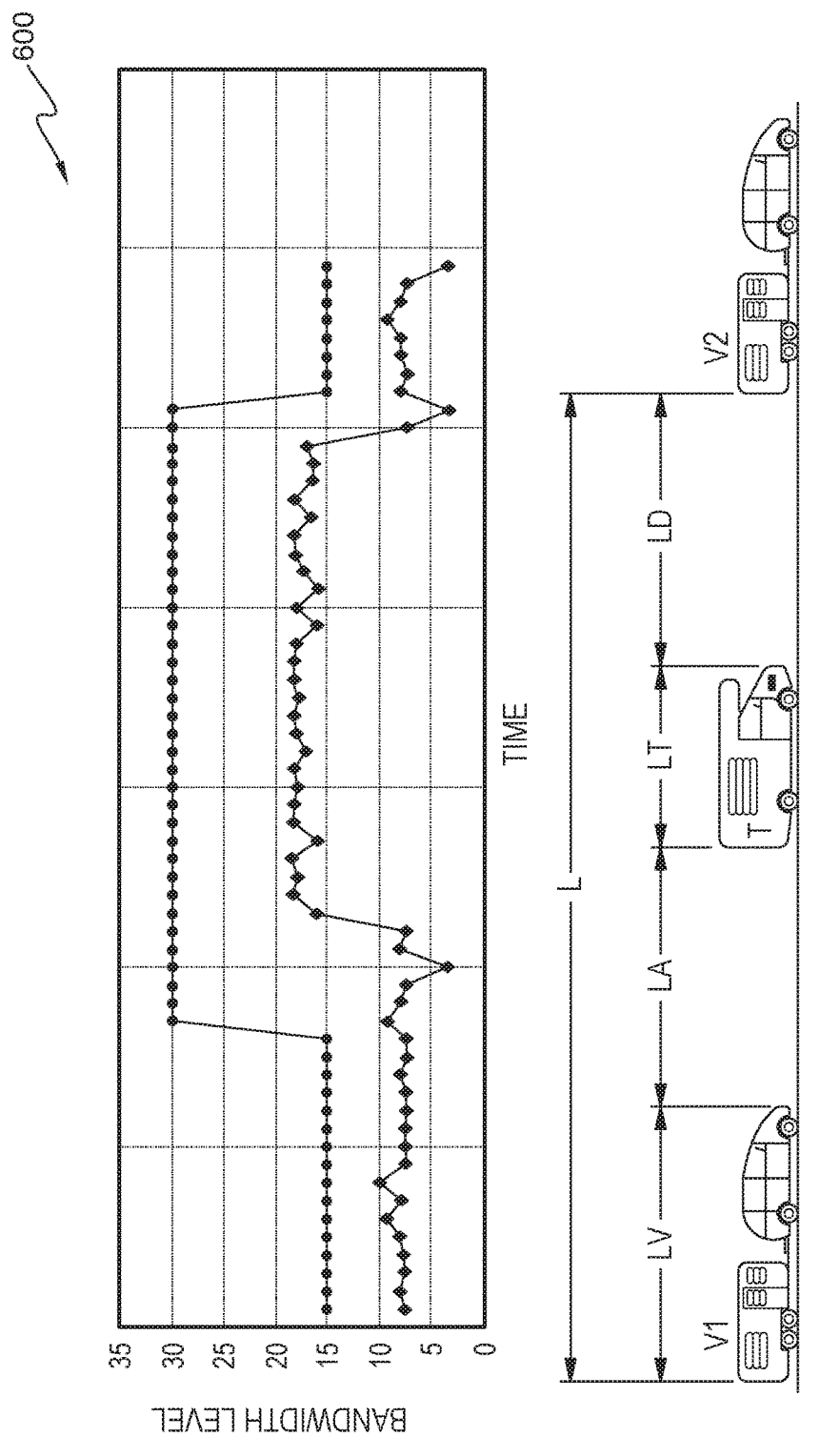
FIG. 6 is an example diagram that shows DTCH, BW, and QCI requirements for an overtaking maneuver for a priority channel.
Figure 6:
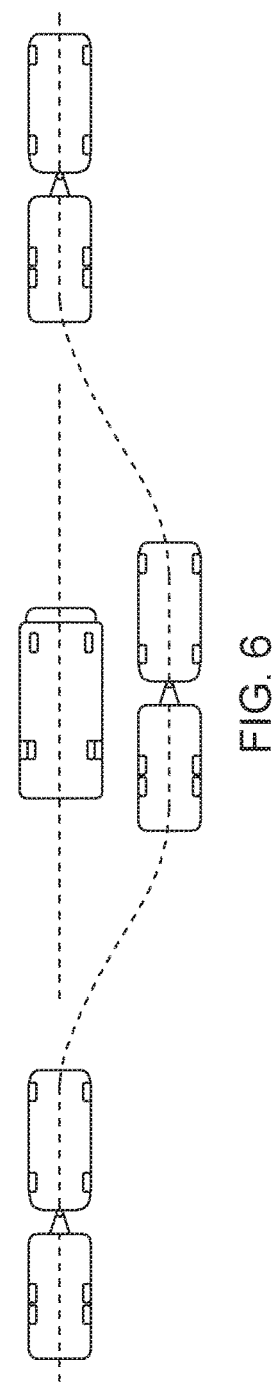

FIG. 6 is an example diagram that shows DTCH, BW, and QCI requirements for an overtaking maneuver for an important channel.

In this example diagram 600, channel optimization program 110 adjusts the DTCH bandwidth and QCI limits for an autonomous vehicle. This example also shows actual data usage or requirements for the overtaking maneuver. In this example, the normal ceiling for usage is set to 15. During an overtaking maneuver, channel optimization increases the limit from 15 to 30 and then returns it to the normal limit of 15 after the overtaking maneuver is completed.

In this example the length that vehicle 1 has to travel is designated as Limit is 15 when vehicle 1 is in position 1, designated LV (e.g., distance of the vehicle attempting the overtaking maneuver. LA is denoted as the length of space between vehicle 2 and the length vehicle 2 occupies is defined as LT (e.g., the base vehicle's length). Channel optimization program 110 can calculate that vehicle 2's trajectory will move to length LD (e.g., distance to be kept between the vehicles after overtaking maneuver is performed) and calculates that the overtaking maneuver length should maneuver vehicle 1's position by LA plus LT plus LD to a position after LD.

In this example, LD can include an entity based time and length distance. For example, LD can be specified to keep a "two-second" distance from another vehicle (e.g., 2 second with current vehicle speed. i.e, (meter per sec)×2).

Figure 7:
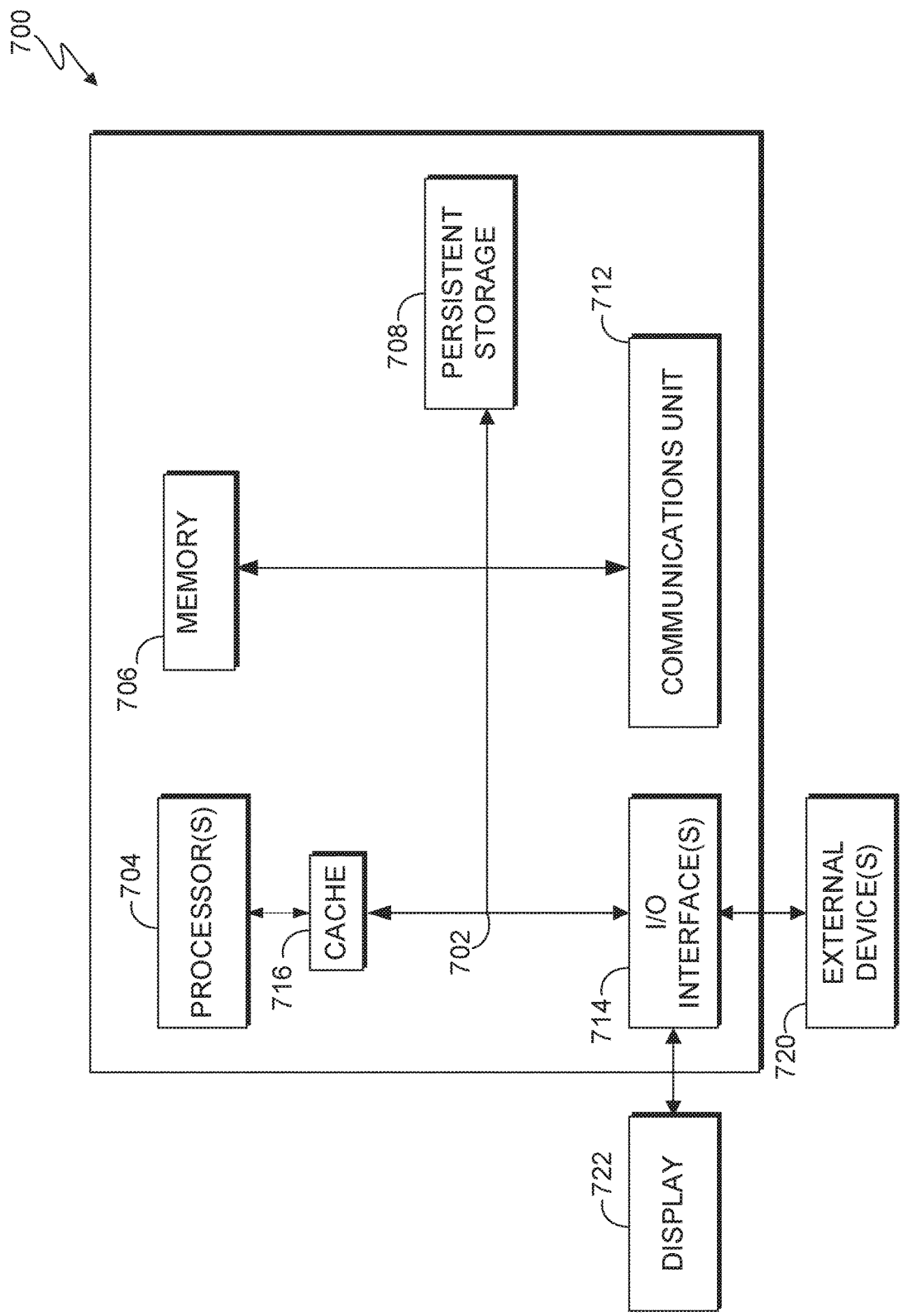
FIG. 7 depicts a block diagram of components of the computing systems of FIG. 1, in accordance with an embodiment of the present invention.

FIG. 7 depicts a block diagram of components of computing systems within computing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Channel optimization program 110 (not shown) may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Channel optimization program 110 may be downloaded to persistent storage 708 through communications unit 710.

I/O interface(s) 712 allows for input and output of data with other devices that may be connected to client computing device and/or server computer. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., channel optimization program 110, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in response to anticipating a maneuver to be performed by a vehicle, adjusting one or more 5G dedicated traffic channels (DTCH) over a radio bearer network;
   reverting the one or more adjusted 5G DTCH after the maneuver is performed by the vehicle;
   providing an API interface for an autonomous vehicle that enables a manual operating mode of the autonomous vehicle; and
   adjusting bandwidth of a 5G dedicated traffic channel of the one or more 5G DTCH that is classified as a priority channel using the API interface.

2. The computer-implemented method of claim 1, further comprising:
   collecting data from IoT devices and transferring the collected data to a service orchestration layer of 5G telecom network.

3. The computer-implemented method of claim 1, further comprising:
   proactively detecting overtaking decisions of the vehicle based on power levels of the vehicle and road conditions that is along a route of the vehicle.

4. The computer-implemented method of claim 2, further comprising:
   collecting trajectory paths of vehicles in proximity to the vehicle, respective distances of each vehicle in proximity to the vehicle, and respective capacities of each vehicle in proximity of the vehicle when predicting an overtaking decision.

5. The computer-implemented method of claim 1, further comprising:
sending an inspection instruction to a virtual network function to allocate additional 5G-DTCH bandwidth over radio interface and S1 bearer to the vehicle performing the maneuver; and
sending a respective inspection instruction to the virtual network function to allocate additional 5G DTCH bandwidth over the radio interface and the S1 bearer to vehicles in proximity to the vehicle.

6. The computer-implemented method of claim 1, wherein adjusting one or more 5G dedicated traffic channels (DTCH) over a radio bearer network comprises:
identifying vehicles in proximity of the vehicle about to perform the maneuver that are utilizing one or more 5G-DTCH channels at a virtual network function and physical network function layer;
classifying each 5G-DTCH channel being used by respective identified vehicles as either a priority 5G-DTCH channel or a non-priority 5G-DTCH channel; and
adjusting bandwidth each 5G-DTCH based on the classification.

7. The computer-implemented method of claim 6, wherein adjusting bandwidth each 5G-DTCH based on the classification comprises:
in response to classifying a 5G-DTCH channel of the one or more 5G-DTCH channels as a non-priority channel, lowering bandwidth and QCI levels during a vehicle overtaking maneuver; and
in response to classifying the 5G-DTCH of the one or more 5G-DTCH channels channel as a priority channel, incrementing bandwidth and QCI levels that are needed during the vehicle overtaking maneuver.

8. The computer-implemented method of claim 7, further comprising:
changing guaranteed bits per second (GBR) to non-GBR and based on situational channel importance during the overtaking maneuver.

9. A computer program product comprising:
one or more computer readable storage media and program instructions stored on the one or more computer readable storage media, the program instructions comprising:
program instructions to in response to anticipate a maneuver to be performed by a vehicle, adjusting one or more 5G dedicated traffic channels (DTCH) over a radio bearer network;
program instructions to revert the one or more adjusted 5G DTCH after the maneuver is performed by the vehicle;
program instructions to provide an API interface for an autonomous vehicle that enables a manual operating mode of the autonomous vehicle; and
program instructions to adjust bandwidth of a 5G dedicated traffic channel of the one or more 5G DTCH that is classified as a priority channel using the API interface.

10. The computer program product of claim 9, wherein the program instructions stored on the one or more computer readable storage media further comprise:
program instructions to collect data from IoT devices and transferring the collected data to a service orchestration layer of 5G telecom network.

11. The computer program product of claim 9, wherein the program instructions to adjust one or more 5G dedicated traffic channels (DTCH) over a radio bearer network comprise:
program instructions to identify vehicles in proximity of the vehicle about to perform the maneuver that are utilizing one or more 5G-DTCH channels at a virtual network function and physical network function layer;
program instructions to classify each 5G-DTCH channel being used by respective identified vehicles as either a priority 5G-DTCH channel or a non-priority 5G-DTCH channel; and
program instructions to adjust bandwidth each 5G-DTCH based on the classification.

12. The computer program product of claim 11, wherein the program instructions to adjust bandwidth each 5G-DTCH based on the classification comprise:
program instructions to, in response to classifying a 5G-DTCH channel of the one or more 5G-DTCH channels as a non-priority channel, lower bandwidth and QCI levels during a vehicle overtaking maneuver; and
program instructions to, in response to classifying the 5G-DTCH channel of the one or more 5G-DTCH channels as a priority channel, increment bandwidth and QCI levels that are needed during the vehicle overtaking maneuver.

13. The computer program product of claim 12, wherein the program instructions stored on the one or more computer readable storage media further comprise:
program instructions to change guaranteed bits per second (GBR) to non-GBR and based on situational channel importance during overtaking.

14. A computer system comprising:
one or more computer processors;
one or more computer readable storage media; and
program instructions stored on the one or more computer readable storage media for execution by at least one of the one or more computer processors, the program instructions comprising:
program instructions to in response to anticipate a maneuver to be performed by a vehicle, adjusting one or more 5G dedicated traffic channels (DTCH) over a radio bearer network;
program instructions to revert the one or more adjusted 5G DTCH after the maneuver is performed by the vehicle;
program instructions to provide an API interface for an autonomous vehicle that enables a manual operating mode of the autonomous vehicle; and
program instructions to adjust bandwidth of a 5G dedicated traffic channel of the one or more 5G DTCH that is classified as a priority channel using the API interface.

15. The computer system of claim 14, wherein the program instructions stored on the one or more computer readable storage media further comprise:
program instructions to collect data from IoT devices and transferring the collected data to a service orchestration layer of 5G telecom network.

16. The computer system of claim 14, wherein the program instructions to adjust one or more 5G dedicated traffic channels (DTCH) over a radio bearer network comprise:
program instructions to identify vehicles in proximity of the vehicle about to perform the maneuver that are utilizing one or more 5G-DTCH channels at a virtual network function and physical network function layer;

program instructions to classify each 5G-DTCH channel being used by respective identified vehicles as either a priority 5G-DTCH channel or a non-priority 5G-DTCH channel; and program instructions to adjust bandwidth each 5G-DTCH based on the classification.

17. The computer system of claim 16, wherein the program instructions to adjust bandwidth each 5G-DTCH based on the classification comprise:

program instructions to, in response to classifying a 5G-DTCH channel of the one or more 5G-DTCH channels as a non-priority channel, lower bandwidth and QCI levels during a vehicle overtaking maneuver; and program instructions to, in response to classifying the 5G-DTCH channel of the one or more 5G-DTCH channels as a priority channel, increment bandwidth and QCI levels that are needed during the vehicle overtaking maneuver.

18. The computer system of claim 17, wherein the program instructions stored on the one or more computer readable storage media further comprise:

program instructions to change guaranteed bits per second (GBR) to non-GBR and based on situational channel importance during overtaking.

* * * * *